United States Patent [19]

Ribi

[11] 4,410,196

[45] * Oct. 18, 1983

[54] SUSPENSION SYSTEM FOR A MOTORVEHICLE WHEEL, PARTICULARLY FOR A MOTORCYCLE WHEEL

[75] Inventor: Valentino Ribi, Genoa, Italy

[73] Assignee: Honda Giken Kogyo Kabushiki Kaisha, Asaka, Japan

[*] Notice: The portion of the term of this patent subsequent to Jul. 15, 1997 has been disclaimed.

[21] Appl. No.: 209,923

[22] Filed: Nov. 24, 1980

[30] Foreign Application Priority Data

Dec. 7, 1979 [IT] Italy ............................... 12861 A/79

[51] Int. Cl.³ ............................................ B62K 21/02
[52] U.S. Cl. ................................... 280/276; 280/279; 280/283
[58] Field of Search ............... 280/276, 277, 279, 281, 280/283, 16, 21 R

[56] References Cited

U.S. PATENT DOCUMENTS 4,212,481 7/1980 Ribi ..................................... 280/276

Primary Examiner—Joseph F. Peters, Jr.
Assistant Examiner—John A. Carroll

Attorney, Agent, or Firm—Pollock, Vande Sande & Priddy

[57] ABSTRACT

Suspension system for a motorcycle wheel, comprising two upright swinging arms disposed in a plane parallel to the plane of the wheel pivoted at their upper ends to a supporting structure of the vehicle and at their lower ends to a wheel-carrying element which, through a prolongation, extends beyond the two pivotal connections between the two swinging arms and the wheel-carrying element. The wheel is mounted on the prolongation, and the wheel axle is located on, or slightly above or below, an ideal straight line passing through the pivotal connections of the two swinging arms to the wheel-carrying element. A shock absorber associated to resilient means is pivoted by its upper end to the supporting structure or to one of the swinging arms, and by its lower end to the wheel-carrying element, at a position located below the ideal straight line, within an area substantially included between the median perpendicular to the segment between the pivotal connections of the two swinging arms to the wheel-carrying arm and the median perpendicular to the segment between the axle of the wheel and the pivotal connection to the wheel-carrying arm of the swinging arm which is nearer to the wheel axle.

4 Claims, 1 Drawing Figure

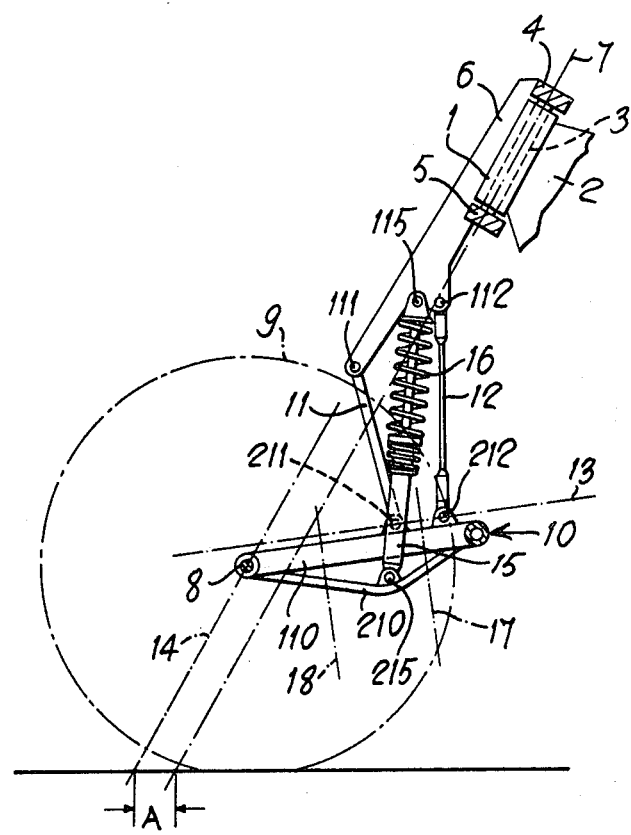

SUSPENSION SYSTEM FOR A MOTORVEHICLE WHEEL, PARTICULARLY FOR A MOTORCYCLE WHEEL

The present invention relates to a suspension system for a motor-vehicle wheel, particularly for a motorcycle wheel, comprising on at least one, and preferably on both of the sides of the wheel, two substantially upright swinging arms disposed in a plane substantially parallel to the plane of the wheel, and pivoted at their upper ends to a supporting structure of the vehicle and at their lower ends to a wheel-carrying element, so that the supporting structure, the two swinging arms and the wheel-carrying element form an articulated quadrilateral, the wheel-carrying element having a prolongation which is parallel to the plane of the wheel and which extends forward or backward beyond the two pivotal connections between the two swinging arms and the wheel-carrying element, with the wheel being mounted on the said prolongation and with at least one resilient means and at least one shock absorber acting on the said articulated quadrilateral to oppose relative movement between the supporting structure and the wheel-carrying element due to a load applied to the motorvehicle.

In the known suspension systems of the aforementioned kind, associated to a shock absorber whose cushioning power is a function of speed, the ratio between the wheel axle excursion and the shock absorber stroke is almost constant, wherefore the energy intake by the shock absorber, both under compression and under tension, is high at the beginning of the wheel axle excursion, and comes down nearly to a zero value towards the end of the said excursion. Therefore, when considering, for example, the landing phase of a vehicle after it has taken a pump, a strong deceleration occurs upon the wheel initially contacting the ground, and thereafter a progressively decreasing deceleration occurs, which may even lead, at the end of the shock absorber stroke, to a blunt shock. At first, i.e., upon the wheel contacting the ground, the shock absorber works in fact within the high speed range, so that it exerts a great cushioning power, and then it works within the low speed range, so that its cushioning power decreases towards the end of its stroke.

The object of the invention is to eliminate the aforementioned drawback and to obtain, for example in the above-stated practical case, a soft contact of the wheel with the ground, i.e., a cushioning power and thence a respective deceleration of the shock absorber, which are low at the beginning and are then gradually increasing towards the end of the shock absorber stroke, whereby the shock absorber is prevented from reaching the end of its stroke with a blunt shock. In other words, the invention aims to obtain that the shock absorber functions at high speeds, i.e., at the beginning of the wheel axle excursion, with a great ratio between the wheel axle excursion and the shock absorber stroke, and at low speeds, i.e., towards the end of the wheel axle excursion, with a lower ratio between the wheel axle excursion and the shock absorber stroke. Such an operation should be obtained not by means of a corresponding progressiveness of the real and proper shock absorber action resulting from particular intrinsic features of the shock absorber, but owing to a special construction of the articulated system consisting of the suspension system and the associated shock absorber. Thus, the particular progressiveness of the cushioning action can be achieved with all the usual types of shock absorbers which are already on the market.

The above problem is solved by the present invention with a suspension system of the kind in which, the wheel axle, which is mounted on the prolongation of the wheel-carrying element, is located substantially on the ideal straight line passing through the pivotal connections of the two swinging arms to the wheel-carrying element, or slightly over or under the said straight line, while the shock absorber has its upper end pivoted either directly or indirectly to the supporting structure, or to one of the swinging arms, and its lower end pivoted either directly or indirectly to the wheel-carrying element, in a position located under the said ideal straight line passing through the pivotal connections of the two swinging arms to the wheel-carrying element, within an area substantially included between the median perpendicular to the section between the pivotal connections of the two swinging arms to the wheel-carrying element, and the median perpendicular to the section between the wheel axle and the pivotal connection of the swinging arm, which is nearer to the wheel axle, to the wheel-carrying element.

Preferably, according to one particular embodiment of the invention, the lower end of the shock absorber is pivoted either directly or indirectly to the wheel-carrying element, at a position located in the area lying under the pivotal connection of the swinging arm, which is nearer to the wheel axle, to the said wheel-carrying element.

The suspension system according to the invention can be applied either to the front wheel or wheels and/or to the rear wheel or wheels of motorcycles or of any other motorvehicles having three, four or more wheels, and also to the wheels of the undercarriages of aircrafts and the like.

BRIEF DESCRIPTION OF THE DRAWING

The special characteristic features of the invention will more clearly appear from the following description of one embodiment thereof, shown in the accompanying drawing, the sole FIGURE of which diagrammatically shows in side elevation and in median vertical section a front suspension system for motorcycles, according to the invention.

DESCRIPTION OF THE PREFERRED EMBODIMENT

In the shown embodiment, the front suspension system for motorcycles, comprises a steering column 1 which is integral with the motorcycle body 2. Rotatably mounted inside the steering column 1 there is the steering pin 3 with which two cross members are integral, an upper cross member 4 and a lower cross member 5. The cross members 4 and 5 are in turn integral with the two arms 6 of an upper steerable fork. The arms 6 are arranged in a spaced apart parallel relation, and extend downward, substantially in the direction of axis 7 of the steering column 1.

The axle 8 of wheel 9 is mounted on with the open forward end of a lower fork 10 placed in a position slightly inclined with respect to the horizontal. Between one of the two wheel-carrying arms 110 of the lower fork 10 and the respective arm 6 of the upper fork there is interposed, on each side of the wheel, an articulated system comprising two substantially upright swinging arms 11 and 12 arranged in non-parallel relation, e.g., converging in the downward direction, i.e., towards the respective wheel-carrying arm 110 of the lower fork 10. The said swinging arms 11, 12 have their upper ends pivoted at 111 and 112 to arm 6 of the upper fork, and their lower ends pivoted at 211 and 212 to the wheel-carrying arm 110 of the lower fork 10, in a zone which is spaced apart, and more particularly retracted from the wheel axle 8. The two swinging arms 11, 12 form, with the respective arm 6 of the upper fork and with the respective wheel-carrying arm 110 of the lower fork 10, an articulated quadrilateral. The axle 8 of wheel 9 is mounted on the forward prolongation of the wheel-carrying arm 110 of the lower fork 10 beyond the pivotal connection 211 between the said wheel-carrying arm 110 and the forwardly positioned swinging arm 11. Moreover, the axle 8 of wheel 9 is located slightly under the ideal straight line 13 passing through the pivotal connections 211, 212 between the two swinging arms 11, 12 and the respective wheel-carrying arm 110 of the lower fork 10. Preferably, the axle 8 of wheel 9 is located also forwardly of the axis 7 of the steering column 1.

The geometry of the aforedescribed articulated system is such that the axle 8 of wheel 9 is moved along an excursion path with a shape corresponding to the requirements of the specific case, and more particularly along an excursion path 14 which is rectilinear or almost rectilinear, and possibly also parallel or almost parallel to the axis 7 of the steering column 1, e.g., so as to keep the forerun A constant over the entire excursion of the wheel.

Each articulated system comprises also a shock absorber 15 which is associated to a spring system consisting of one or more springs 16, and which is pivoted by its upper end at 115 to the respective arm 6 of the upper fork, and by its lower end at point 215 to the respective wheel-carrying arm 110 of the lower fork 10, or, more precisely, to an arcuate member 210 extending under the wheel-carrying arm 110 and integral therewith.

More particularly, the lower point 215 of pivotal connection of shock absorber 15 is sensibly below the ideal straight line 13 passing through the pivotal connection 211 and 212 between the wheel-carrying arm 110 of the lower fork 10 and the two swinging arms 11, 12. Moreover, the lower point 215 of pivotal connection of shock absorber 15 is located in the area included between the median perpendicular 17 to the section of the said ideal right line 13 between the pivotal connections 211, 212 of the two swinging arms 11, 12 to the wheel-carrying arm 110 of the lower fork 10 and the median perpendicular 18 to the segment of the said straight line 13 between the axle 8 of wheel 9 and the pivotal connection 211 of the forwardly positioned swinging arm 11 to the wheel-carrying arm 110 of the lower fork 10. Preferably, as shown in the drawing, the lower point 215 of pivotal connection of shock absorber 15 is located in the area lying under the pivotal connection between the wheel-carrying arm 110 of the lower fork 10 and the swinging arm 11 which is nearer to the axle 8 of wheel 9, i.e., the forwardly positioned swinging arm, in the present case.

With the just-described construction, the ratio between the excursion of axle 8 of wheel 9 and the stroke of shock absorber 15 is initially great, but decreases towards the end of the excursion of axle 8 of wheel 9. Therefore, even when the shock absorber 15 is of a known type, in which the cushioning power is a function of speed, for example during the landing phase of a motorcycle after it has taken a jump, a smaller deceleration is obtained at the beginning, due to the initially lower cushioning power of the shock absorber, and deceleration increases towards the end of the shock absorber stroke, due to the respective increase of the shock absorber cushioning power. Thus, in the case of a motorcycle having taken a jump, a soft contact of wheel 9 with the ground is achieved, while a blunt shock at the end of the stroke of shock absorber 15 is prevented.

By shifting the lower point 215 of pivotal connection of shock absorber 15 into different positions within the above defined limits, different mean values are obtained of the ratio between the wheel axle excursion and the shock absorber stroke, and also different types of variation in said ratio, and thus different types of progressiveness of of the shock absorber action, also in connection with the geometry of the articulated suspension system. In the illustrated embodiment, the shock absorbers 15 which are provided on both sides of wheel 9 are each arranged in an inner position, between the wheel 9 and the respective articulated lateral suspension system in which the wheel-carrying arm 110 of the lower fork 10 and the arm 6 of the upper fork are preferably disposed between the respective shock absorber 15 and the two swinging arms 11, 12, which are thus located in a more external position.

Such an arrangement of shock absorbers 15 reduces the inertia relative to the axis 7 of the steering column 1, and the eccentric masses relative to the vertical plane of wheel 9.

The invention is not limited to motorcycles, nor to the front suspensions, but is applicable to any other vehicles, and also to the rear suspensions. Particularly, in the case of rear suspensions, the articulated suspension system may be a mirror image of the illustrated system, i.e., the wheel axle will be mounted at the rear end of the lower fork 10, while the two swinging arms 11, 12 will be pivoted to the forward end of said fork 10, and the upper fork provided with arms 6 will be constituted by a part of the vehicle body.

The invention is not limited to the particular construction of the illustrated embodiment, but is applicable to any other construction and configuration of the suspension system consisting of the articulated quadrilateral formed by the upper suspension structure (body or steerable fork), the lower wheel-carrying structure and the non-parallel swinging arms pivotally connected between the said two structures. The lower wheel-carrying structure may consist of a fork more or less inclined with respect to the horizontal or substantially horizontal, or the whole or in part inclined or horizontal, as shown, but might be also formed by an analogous frame, or generally by two wheel-carrying arms arranged on opposite sides of the wheel, and which are made and connected to each other in any desired manner. At least one end of shock absorber 15 may be pivoted indirectly, i.e., with the interposition of any mechanical transmission system, such as a linkage, to the respective upper and/or lower pivotal connection point 115, 215.

I claim:

1. A front suspension system for a motorcycle wheel, comprising
   (a) a suspension structure mounted on a steering column and inclined downwardly in a forward direction;
   (b) two swinging arms pivoted at one end to said suspension structure and at the other end to a wheel-carrying element so that said suspension structure, said two swinging arms and said wheel-carrying element form an articulated quadrilateral;
(c) shock absorber means acting on said articulated quadrilateral to oppose relative movement between said suspension structure and said wheel-carrying element due to a load applied to said motorcycle;
(d) said wheel-carrying element having a prolongation extending forwardly beyond said two connecting points between said two swinging arms and said wheel-carrying element, for mounting a motorcycle wheel;
(e) said shock absorber means having its upper end pivoted to said supporting structure, and its lower end pivoted to said wheel-carrying element, at a position below the ideal straight line passing through said pivotal connections of said two swinging arms to said wheel-carrying element.

2. A suspension system according to claim 1, wherein the lower end of said shock absorber means is pivoted to said wheel-carrying element, at a position located in the area lying below the pivotal connection to said wheel-carrying element of the swinging arm which is nearer to said wheel axle.

3. A suspension system according to claim 1, wherein the lower end of said shock absorber means is pivoted to said wheel-carrying element within an area substantially included between the median perpendicular to the segment between said pivotal connections of said two swinging arms to said wheel-carrying element, and the median perpendicular to the segment between said axle of said wheel and the pivotal connection to said wheel-carrying element of the swinging arm which is nearer to said wheel axle.

4. A suspension system according to claim 1, wherein said swinging arms and prolongation of said wheel-carrying element are parallel to the plane of said wheel.

* * * * *